US012757174B2

(12) United States Patent
Qiao

(10) Patent No.: US 12,757,174 B2
(45) Date of Patent: Oct. 6, 2026

(54) METHOD AND DEVICE FOR TIME-DOMAIN RESOURCE ALLOCATION

(71) Applicant: Beijing Xiaomi Mobile Software Co., Ltd., Beijing (CN)

(72) Inventor: Xuemei Qiao, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 274 days.

(21) Appl. No.: 18/554,104

(22) PCT Filed: Apr. 7, 2021

(86) PCT No.: PCT/CN2021/085765
§ 371 (c)(1),
(2) Date: Oct. 5, 2023

(87) PCT Pub. No.: WO2022/213294
PCT Pub. Date: Oct. 13, 2022

(65) Prior Publication Data
US 2024/0188054 A1 Jun. 6, 2024

(51) Int. Cl.
*H04W 4/00* (2018.01)
*H04W 72/0446* (2023.01)

(52) U.S. Cl.
CPC ............................... *H04W 72/0446* (2013.01)

(58) Field of Classification Search
CPC ............. H04W 72/0446; H04W 72/23; H04W 72/232
See application file for complete search history.

(56) References Cited

U.S. PATENT DOCUMENTS

2020/0351925 A1* 11/2020 Bagheri ............ H04W 52/0229
2020/0351934 A1* 11/2020 Khoshnevisan ...... H04L 5/0053
2021/0051652 A1* 2/2021 Khoshnevisan ...... H04L 1/1893
2021/0153228 A1* 5/2021 Shi ...................... H04W 72/569
2022/0046617 A1* 2/2022 Sasaki ................... H04L 5/0053
2022/0167389 A1* 5/2022 Kim ....................... H04L 5/0023
2022/0279555 A1* 9/2022 Xiao ................. H04W 72/0446
2022/0303988 A1* 9/2022 Yi .......................... H04L 5/0044
2023/0135551 A1* 5/2023 Gao ...................... H04L 5/0055
370/329

(Continued)

FOREIGN PATENT DOCUMENTS

CN 111901084 A 11/2020
JP 2021-29010 A 2/2021
WO WO 2020206164 A1 10/2020

OTHER PUBLICATIONS

Notice of Reasons for Refusal issued by the Japanese Patent Office on Nov. 12, 2024, in corresponding Application No. JP 2023-561251, 11 pages.

(Continued)

*Primary Examiner* — Abdelnabi O Musa
(74) *Attorney, Agent, or Firm* — Finnegan, Henderson, Farabow, Garrett & Dunner, L.L.P.

(57) ABSTRACT

A method for time domain resource assignment is performed by a terminal device, and includes: acquiring a time domain resource assignment (TDRA) table, wherein the TDRA table includes a first field, and a second field corresponding to the first field; and performing time domain resource assignment according to the first field and the second field.

16 Claims, 4 Drawing Sheets

(56) References Cited

U.S. PATENT DOCUMENTS

2023/0198683 A1* 6/2023 Gao .................. H04W 72/1273
370/280

OTHER PUBLICATIONS

International Search Report and Written Opinion of International Application No. PCT/CN2021/085765, dated Jan. 6, 2022, 16 pages.
Wilus Inc., "Discussion on TB processing over multi-slot PUSCH", 3GPP TSG RAN WG1 #104-e, R1-2101680, e-Meeting, Jan. 25-Feb. 5, 2021, 3 pages.
Vivo, "Discussion on PUSCH TB processing over multiple slots", 3GPP TSG RAN WG1 #104-e, R1-2100458, e-Meeting, Jan. 25-Feb. 5, 2021, 7 pages.
Nokia, Nokia Shanghai Bell, "On PUSCH enhancements for NR URLLC", 3GPP TSG RAN WG1 Meeting #98bis, R1-1910800, Chongqing, China, Oct. 14-20, 2019, 10 pages.
Office Action issued by the Russian Federation Federal Institute of Industrial Property on May 5, 2024, in corresponding Application No. RU 2023128223/07 (7 pages).
Extended European Search Report Issued in Application No. 21935530.2 dated Apr. 10, 2024, 11 pages.
"Enhancements for TB processing over multi-slot PUSCH", 3GPP TSG-RAN WG1 #104-e, R1-2101002, Lenovo, Motorola Mobility, e-Meeting, Jan. 25-Feb. 5, 2021, 3 pages.
"TB processing over multi-slot PUSCH", 3GPP TSG-RAN WG1 #104-e, R1-2101222, Samsung, e-Meeting, Jan. 25-Feb. 5, 2021, 5 pages.
Office Action for Indian application No. 202347074798, dated May 22, 2025.
3GPP TS 38.214 V15.12.0 (Mar. 2021), 3rd Generation Partnership Project; Technical Specification Group Radio Access Network; NR; Physical layer procedures for data (Release 15), 106 pages.
Request for the Submission of an Opinion for Korean Application No. 10-2023-7037885, dated Dec. 17, 2025, 13 pages.

* cited by examiner

METHOD AND DEVICE FOR TIME-DOMAIN RESOURCE ALLOCATION

CROSS REFERENCE TO RELATED APPLICATION

This application is a US national phase application of International Application No. PCT/CN2021/085765, filed on Apr. 7, 2021, the entire content of which is incorporated herein by reference.

TECHNICAL FIELD

The present disclosure relates to the field of communication technologies, in particularly, to a method for time domain resource assignment and a device thereof.

BACKGROUND

At present, time domain resource assignment for a physical uplink shared channel (PUSCH) may use a time domain resource assignment (TDRA) table similar to PUSCH repetition type B or PUSCH repetition type A. For a case where a transmission manner of the PUSCH is a TB processing over multi-slots (TBoMS), since one transmission block is transmitted on multi slots simultaneously, the existing TDRA table for PUSCH repetition type B or PUSCH repetition type A cannot be applied compatibly in a manner of time domain resource assignment for TBoMS to perform the time domain resource assignment.

SUMMARY

According to a first aspect, an embodiment of the present disclosure provides a method for time domain resource assignment, performed by a terminal device. The method includes: acquiring a time domain resource assignment (TDRA) table, in which, the TDRA table includes a first field, and a second field corresponding to the first field; and performing time domain resource assignment according to the first field and the second field.

According to a second aspect, an embodiment of the present disclosure provides a method for time domain resource assignment, performed by a base station. The method includes: configuring a time domain resource assignment (TDRA) table for a terminal device, in which, the TDRA table includes a first field, and a second field corresponding to the first field; and performing time domain resource assignment according to the first field and the second field.

According to a third aspect, an embodiment of the present disclosure provides a communication device. The communication device includes a processor and a memory having a computer program stored thereon. The processor is configured to: acquire a time domain resource assignment (TDRA) table, in which, the TDRA table includes a first field, and a second field corresponding to the first field; and perform time domain resource assignment according to the first field and the second field.

BRIEF DESCRIPTION OF THE DRAWINGS

The accompanying drawings will be briefly described below.

DETAILED DESCRIPTION

For ease of understanding, terms related to the present disclosure are introduced first.

1. Downlink Control Information (DCI)

The DCI is carried by a physical downlink control channel (PDCCH). The DCI may include uplink and downlink resources assignment, hybrid automatic repeat request (HARQ) information, a power control, etc. The PDCCH is a physical channel, and configured to carry downlink scheduling information.

2. Physical Uplink Share Channel (PUSCH)

The PUSCH is configured to carry uplink services related to users and upper layer signaling data in long term evolution. As a major uplink data carrier channel in a physical layer, the PUSCH can schedule and transmit uplink data and also carry control information.

In order to better understand a method for time domain resource assignment proposed in an embodiment of the present disclosure, a communication system used in an embodiment of the present disclosure will be described below.

Figure 1:
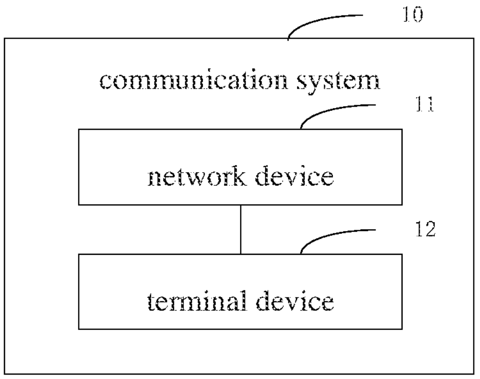
FIG. 1 is a schematic diagram illustrating an architecture of a communication system provided in an embodiment of the present disclosure.

Please referring to FIG. 1, FIG. 1 is a schematic diagram illustrating an architecture of a communication system 10 provided in an embodiment of the present disclosure. The communication system 10 may include, but is not limited to, a network device 11 and a terminal device 12. Numbers and forms of the devices as illustrated in FIG. 1 are for example only and do not constitute a limitation to embodiments of the present disclosure. In practical applications, the system may include two or more network devices 11 or two or more terminal devices 12. The communication system 10 as illustrated in FIG. 1 takes including one network device 11 and one terminal device 12 as an example.

It should be noted that the technical solution of embodiments of the present disclosure may be applied to various communication systems, for example, a long-term evolution (LTE) system, a 5th generation (5G) mobile communication system, a 5G new radio (NR) system, or other future new mobile communication systems.

The network device 11 in embodiments of the present disclosure is a physical device for transmitting or receiving signals at a network side. For example, the network device 101 may be an evolved NodeB (eNB), a transmission reception point (TRP), a next generation NodeB (gNB) in an NR system, base stations in other future mobile communication systems, or access nodes in wireless fidelity (WiFi) systems. A specific technology and a specific device form adopted by the network device are not limited in embodiments of the present disclosure. The network device 11 provided in embodiments of the present disclosure may be composed of a central unit (CU) and a distributed unit (DU). The CU may also be referred to as a control unit. A CU-DU structure may be adopted to separate protocol layers of the network device, such as a base station. Functions of some protocol layers may be controlled centrally by the CU, and functions of the remaining or all protocol layers may be distributed within the DU which is centrally controlled by the CU.

The terminal device 102 in embodiments of the present disclosure is physical device for receiving or transmitting signals at a user side, such as a mobile phone. The terminal device may also be referred to as a terminal, a user equipment (UE), a mobile station (MS), a mobile terminal (MT), etc. The terminal device may be a vehicle with a communication feature, a smart vehicle, a mobile phone, a wearable device, a pad, a computer with a wireless transceiver feature, a virtual reality (VR) terminal, an augmented reality (AR) terminal, a wireless terminal in industrial control, and a wireless terminal in self-driving, a wireless terminal in remote medical surgery, a wireless terminal in smart grid, a wireless terminal in transportation safety, a wireless terminal in smart city, and a wireless terminal in smart home, etc. A specific technology and a specific device form adopted by the terminal device 12 are not limited in embodiments of the present disclosure.

In the related art, type B PUSCH repetition is a PUSCH repetition solution based on sub-slot aggregation, which can enhance reliability of a PUSCH transmission while further reducing a transmission delay. For the type B PUSCH repetition, an uplink grant signaling or a first type of grant free configuration information indicates resources of a first nominal PUSCH, while time domain resources of the remaining PUSCH repetitions depend on a first PUSCH repetition and an available symbol. A number of repetitions indicated by the base station represents a nominal repetition number, and an actual repetition number may be greater than the nominal repetition number. When a time domain resource of the nominal PUSCH crosses a boundary of a slot, the nominal PUSCH will be divided into two actual PUSCH transmissions. One column may be added into a TDRA table for a time domain resource assignment, to indicate a number of repetitions for a PUSCH repetition, and values of the column may be $\{1, 2, 3, 4, 7, 8, 12, 16\}$. At the same time, an RRC high layer signaling uses 4 bits to represent a start time domain position S and a length L of a data transmission, where $0<=S<=13$, $1<=L<=14$, which can achieve $S+L>14$.

TDRA for type A repetition is a first solution of sending uplink data multiple times, also known as repetition for an uplink data packet, which can also be referred to as repeated transmission or aggregation, or aggregated transmission. A number of sending the same uplink packet can be referred to as the repetition number or an aggregation factor. The TDRA table includes a start and length indicator value (SLIV) field, which is configured to determine the start time domain position S and the length L of the data transmission for each transmission; and also includes a repetition number field, which is configured to determine a number N of blind repetitions. The blind repetitions are performed in adjacent N slots, and one complete repetition is performed in one slot. The blind repetitions have a same symbol position in respective slots.

TDRA for TBoMS, that is, time domain resource assignment for TBoMS, may use PUSCH replication type A like or PUSCH replication type B like time domain resource assignment (TDRA). For the type B like manner, the related art proposes to extend the length L of data transmission to more than 14 symbols, and determine a time domain symbol length required for the TBoMS only through an L field. In the TBoMS, there is no concept related to repetition, and the type A or type B like TDRA cannot directly use a method for time domain assignment provided in embodiments of the present disclosure to redefine some fields in the TDRA table, such as a repetition number field/L field, to be suitable for the TBoMS mode.

It can be understood that the communication system described in embodiments of the present disclosure is intended to provide a clearer explanation of the technical solution of embodiments of the present disclosure, and does not constitute a limitation on the technical solution proposed in embodiments of the present disclosure. As those ordinary skilled in the art known, with evolution of the system architecture and emergence of new business scenarios, the technical solution proposed in embodiments of the present disclosure is also applicable to the similar technical problem.

A method for time domain resource assignment, a device thereof provided in the present disclosure are described in detail with reference to the accompany drawings below.

Figure 2:
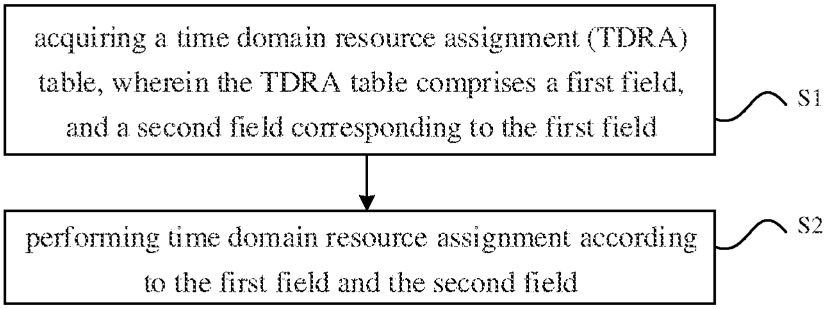
FIG. 2 is a flowchart illustrating a method for time domain resource assignment according to an embodiment of the present disclosure.

FIG. 2 is a flowchart illustrating a method for time domain resource assignment according to an embodiment of the present disclosure. The method may be performed by a terminal device. As illustrated in FIG. 2, the method may include, but is not limited to, the following block.

At block S1, a time domain resource assignment (TDRA) table is acquired. The TDRA table includes a first field, and a second field corresponding to the first field.

In an embodiment of the present disclosure, the acquired TDRA table may be a TDRA table for PUSCH replication type A or type B with certain defined fields. It can be understood that certain defined fields may be original fields in the existing TDRA table for PUSCH replication type A or type B, or newly added fields.

Alternatively, in an embodiment of the present disclosure, the acquired TDRA table may be the existing TDRA table for PUSCH replication type A or type B, which will not be limited in the present disclosure.

The first field included in the TDRA table is acquired. In some embodiments, the first field is carried by an L field in the TDRA table. It can be understood that the L field in the TDRA table can determine a length of data transmission.

In an embodiment of the present disclosure, the second field corresponding to the first field is acquired based on the acquired first field. In some embodiments, the second field is carried by a repetition number field in the TDRA table. It is understandable that the repetition number field in the TDRA table may determine a repetition number of data transmission.

At block S2, time domain resource assignment is performed according to the first field and the second field.

In an embodiment of the present disclosure, the length of data transmission is determined based on the first field, and the repetition number of data transmission is determined based on the second field. Therefore, the time domain resource assignment method may be determined, so that the corresponding time domain resource assignment method can be used for the time domain resource assignment according to the corresponding time domain resource assignment method.

By implementing an embodiment of the present disclosure, the TDRA table is acquired, the first field included in the TDRA table is acquired, and the second field corresponding to the first field is acquired, and the time domain resource assignment is performed according to the first field and the second field. Therefore, the TDRA table can be applied to the corresponding time domain resource assignment manner to perform the time domain resource assignment.

Figure 3:
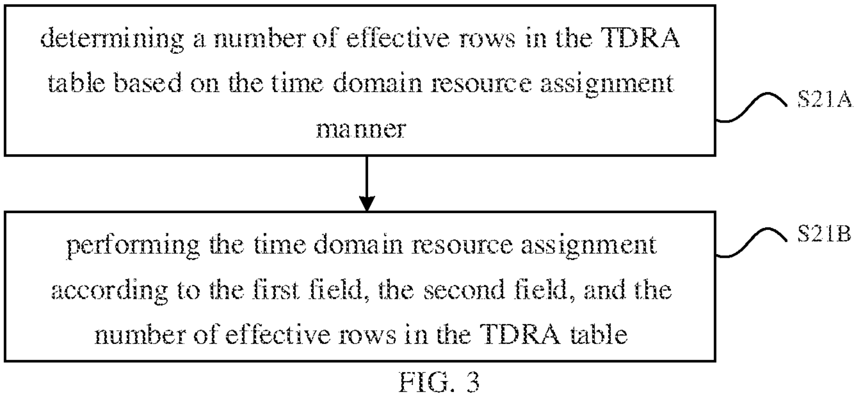
FIG. 3 is a flowchart illustrating a method for time domain resource assignment according to another embodiment of the present disclosure.

In some embodiments, as illustrated in FIG. 3, the above block S2 in an embodiment of the present disclosure further includes the following blocks.

At block S21A, a number of effective rows in the TDRA table is determined based on the time domain resource assignment manner.

At block S21B, the time domain resource assignment is performed according to the first field, the second field, and the number of effective rows in the TDRA table.

The time domain resource assignment manner includes: a transport block processing over multi-slots (TBoMS) manner; a repetition manner; or a TBoMS with repetition manner.

For the repetition manner, rows with an L field lower than or equal to 14 symbols are effective in the TDRA table.

For the transport block processing over multi-slots (TBoMS) manner, rows with an L field greater than 14 symbols are effective, and rows with a repetition number greater than one symbol are ineffective in the TDRA table.

For the TBoMS with repetition manner, rows with an L field greater than 14 symbols and rows with a repetition number greater than one symbol both are ineffective in the TDRA table.

Figure 4:
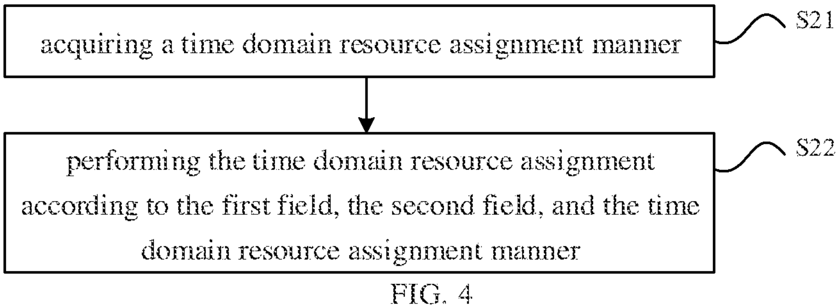
FIG. 4 is a flowchart illustrating a method for time domain resource assignment according to another embodiment of the present disclosure.

In some embodiments, as illustrated in FIG. 4, the above block S2 in an embodiment of the present disclosure further includes the following blocks.

At block S21, a time domain resource assignment manner is acquired.

At block S22, the time domain resource assignment is performed according to the first field, the second field, and the time domain resource assignment manner.

In some embodiments, in an embodiment of the present disclosure, the time domain resource assignment manner includes at least one of the following transmission manners: a transport block processing over multi-slots (TBoMS) manner; a repetition manner; or a TBoMS with repetition manner.

It is understood that the time domain resource assignment manner in an embodiment of the present disclosure may be: the transport block processing over multi-slots (TBoMS) manner, or the repetition manner, or the TBoMS with repetition manner, or a combination of the transport block processing over multi-slots (TBoMS) manner and the repetition manner, or any combination of the three manners.

The repetition manner refers to that: in a 5G communication system, a sender may repeatedly transmit the same data in a time domain, thus utilizing a time domain diversity gain and a hybrid automatic repeat request (HARQ) merging gain brought about by a change of a channel in the time domain to improve reliability of data transmission. For example, the terminal device may transmit different redundancy versions (RVs) of the same transport block (TB) across a plurality of time units. One RV of the TB is transmitted across a single time unit, and the TB is transmitted through one transmission layer. A base station combines and decodes data received across the plurality of time units, thus improving a success rate of data reception and increasing the reliability of data propagation. However, the transport block processing over multi-slots (TBoMS) manner refers to that one transport block of the PUSCH is transmitted through a plurality of slots, without concept related to repetition. The TBoMS with repetition manner can be understood as a TBoMS manner with a repetition function.

Figure 5:
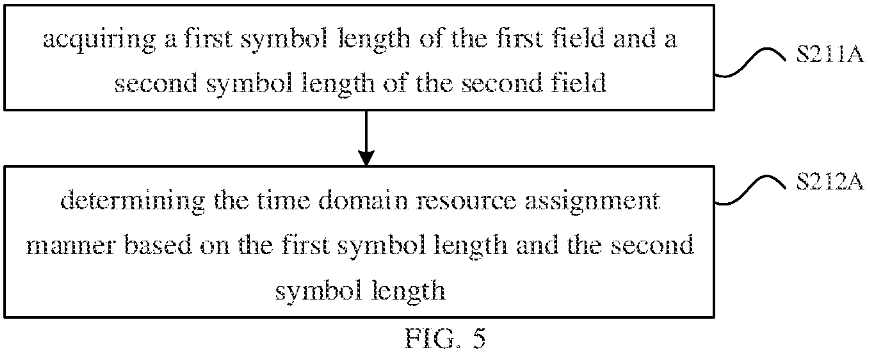
FIG. 5 is a flowchart illustrating a method for time domain resource assignment according to another embodiment of the present disclosure.

In some embodiments, as illustrated in FIG. 5, the block S21 in the method of an embodiment of the present disclosure further includes the following blocks.

At block S211A, a first symbol length of the first field and a second symbol length of the second field are acquired.

Specifically, in an embodiment of the present disclosure, in a case where the first field is an L field, the first symbol length carried in the L field is a length L of data transmission, and in a case where the second field is a repetition number field, the second symbol length carried by the repetition number field is a repetition number.

At block S212A, the time domain resource assignment manner is determined based on the first symbol length and the second symbol length.

For example, in response to the length L of data transmission being greater than 14 and the repetition number being greater than 1, the time domain resource assignment manner is determined as the TBoMS with repetition manner.

In response to the length L of data transmission being greater than 14 and the repetition number being lower than or equal to 1, the time domain resource assignment manner is determined as the transport block processing over multi-slots (TBoMS) manner.

In response to the length L of data transmission being lower than 14 and the repetition number being greater than 1, the time domain resource assignment manner is determined as the repetition manner.

In an embodiment of the present disclosure, the first symbol length of the first field and the second symbol length of the second field are acquired, and the time domain resource assignment manner can be determined.

Figure 6:
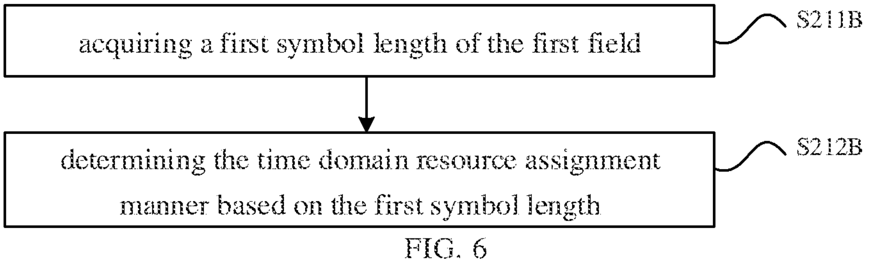
FIG. 6 is a flowchart illustrating a method for time domain resource assignment according to another embodiment of the present disclosure.

In some other embodiments, as illustrated in FIG. 6, the block S21 in the method of an embodiment of the present disclosure further includes the following blocks.

At block S211B, a first symbol length of the first field is acquired.

At block S212B, the time domain resource assignment manner is determined based on the first symbol length.

Specifically, in an embodiment of the present disclosure, in a case where the first field is an L field, the first symbol length carried in the L field is a length L of data transmission.

For example, in response to the length L of data transmission being lower than 14, the time domain resource assignment manner is determined as the repetition manner. In response to the length L of data transmission being greater than 14, the time domain resource assignment manner is determined as the transport block processing over multi-slots (TBoMS) manner or the TBoMS with repetition manner.

Figure 7:
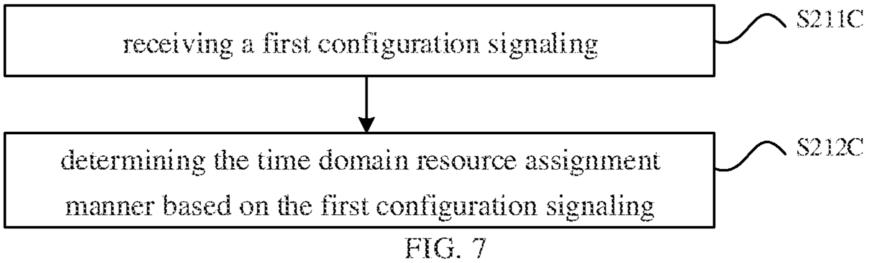
FIG. 7 is a flowchart illustrating a method for time domain resource assignment according to another embodiment of the present disclosure.

In some other embodiments, as illustrated in FIG. 7, the block S21 in the method of an embodiment of the present disclosure further includes the following blocks.

At block S211C, a first configuration signaling is received.

In some embodiments, the first configuration signaling in an embodiment of the present disclosure is a remaining minimum system information (RMSI) signaling, a radio resource control (RRC) signaling, a downlink control information (DCI) signaling, or a media access control control element (MAC CE) signaling.

At block S212C, the time domain resource assignment manner is determined based on the first configuration signaling.

The first configuration signaling is configured to determine the corresponding time domain resource assignment manner as one of the transport block processing over multi-slots (TBoMS) manner, the repetition manner, or the TBoMS with repetition manner.

In some embodiments, the remaining minimum system information (RMSI) signaling or the radio resource control (RRC) signaling may be determined the time domain resource assignment manner as: one of the transport block processing over multi-slots (TBoMS) manner, the repetition manner, or the TBoMS with repetition manner; or one of the transport block processing over multi-slots (TBoMS) manner and the repetition manner. The downlink control information (DCI) signaling, or the media access control control element (MAC CE) signaling may be determined the time domain resource assignment manner as: one of the transport block processing over multi-slots (TBoMS) manner and the repetition manner.

Determining the corresponding time domain resource assignment manner based on the first configuration signaling can be understood as that different contents of the first configuration signaling may directly determine different time domain resource assignment manners.

In a case of determining the time domain resource assignment manner based on the downlink control information (DCI) signaling, or the media access control control element (MAC CE) signaling, the repetition is still used a separate start symbol bit S and a time domain symbol length L in the TDRA table, or a start and length indicator value (SLIV) field, configured to determine a start time domain position S and the time domain symbol length L for each transmission. The TDRA table also includes a repetition number field, configured to determine a number N of blind repetitions. The blind repetitions are performed in adjacent N slots, and one complete repetition is performed in one slot. The blind repetitions have a same symbol position in respective slots.

Figure 8:
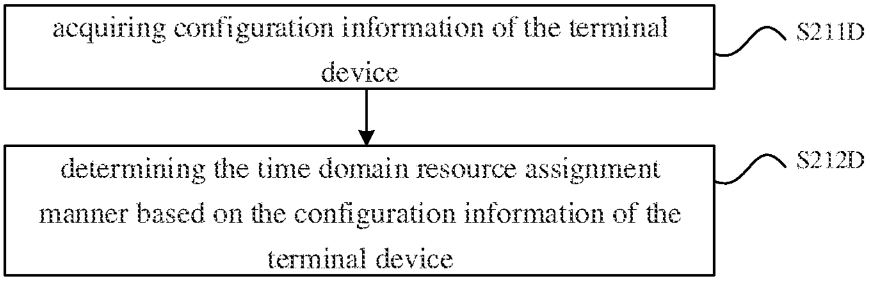
FIG. 8 is a flowchart illustrating a method for time domain resource assignment according to another embodiment of the present disclosure.

In some other embodiments, as illustrated in FIG. 8, the block S21 in the method of an embodiment of the present disclosure further includes the following blocks.

At block S211D, configuration information of the terminal device is acquired.

At block S212D, the time domain resource assignment manner is determined based on the configuration information of the terminal device.

In embodiments of the present disclosure, the configuration information of the terminal device may be acquired, and the time domain resource assignment manner corresponding to the configuration information may be determined. The determined time domain resource assignment manner may be at least one of the transport block processing over multi-slots (TBoMS) manner, the repetition manner, or the TBoMS with repetition manner.

The terminal device may directly configure the time domain resource assignment table manner to determine the time domain resource assignment manner in a manner of implicit indication.

Specifically, when the terminal device configures TDRA list for repetition, it is indicated that only the repetition manner is supported, and the transport block processing over multi-slots (TBoMS) manner and the TBoMS with repetition manner are not supported. The TDRA table in the TDRA list for replication includes the replication field, and L is less than 1.

When the terminal device configures TDRA list for TBoMS, it is indicated that the transport block processing over multi-slots (TBoMS) manner is supported. In the TDRA table in the TDRA list for TBoMS, L is greater than 14, but the replication field is not included.

In some embodiments, the block S212D in the method further include the following blocks.

At block SD1, a repetition number is acquired.

At block SD2, the corresponding time domain resource assignment manner is determined based on the configuration information of the terminal device and the repetition number.

In an embodiment of the present disclosure, in a case of the terminal device configuring TDRA for TBoMS, it may be determined whether the configuration information of the terminal device supports the TBoMS with repetition manner through in the downlink control information (DCI) signaling indicating rows with the number of repeat transmissions being greater than 1 in the TDRA table. In response to the repetition number in the TDRA table being greater than 1, it indicates that TDRA for TBoMS is configured to support the TBoMS with repetition manner.

In some embodiments, the block SD1 in the method further include the following blocks.

At block SD11A, a repetition number set carried by an RMSI signaling or an RRC signaling is received.

At block SD12A, a DCI signaling or an MAC CE signaling is received, and the repetition number is selected from the repetition number set based on the DCI signaling or the MAC CE signaling.

In an embodiment of the present disclosure, the repetition number set carried by the downlink control information (DCI) signaling or the media access control control element (MAC CE) signaling is received, and the second configuration instruction is received as the RMSI signaling or the RRC signaling, and the repetition number is selected from the repetition number set based on the RMSI signaling or the RRC signaling.

In some embodiments, the block SD1 in the method further include the following blocks.

At block SD11B, a repetition number setting identifier is acquired.

At block SD12B, the repetition number is determined based on the repetition number setting identifier.

Specifically, in an embodiment of the present disclosure, the repetition number setting identifier is acquired. The repetition number setting identifier may be 0 or 1. When the repetition number setting identifier is 0, it indicates that no repetition is performed. When the repetition number setting identifier is 1, it indicates that repetition is performed.

In an embodiment of the present disclosure, the repetition number setting identifier may be set through the downlink control information (DCI) signaling or the media access control control element (MAC CE) signaling.

In some embodiments, the block SD1 in the method further include the following blocks.

At block SD11C, whether the TDRA table comprises state information of a repetition number field is acquired.

At block SD12C, the repetition number is determined based on the state information.

Specifically, the state information of the repetition number field may be whether the TDRA table includes the repetition number field. There are a plurality of TDRA tables, including the TDRA for replication or the TDRA for TBoMS, etc.

For example, when the terminal device configures TDRA for repetition, it is indicated that only the repetition manner is supported, and the transport block processing over multi-slots (TBoMS) manner and the TBoMS with repetition manner are not supported. When the terminal device configures TDRA for TBoMS, it is indicated that the transport block processing over multi-slots (TBoMS) manner is supported.

In some embodiments, a plurality of TDRA tables are provided, and each TDRA table corresponds to one time domain resource assignment manner.

In some embodiments, the plurality of TDRA tables includes a first TDRA table and a second TDRA table, and the second TDRA table further includes the repetition number relative to the first TDRA table.

In an embodiment of the present disclosure, different TDRA tables may correspond to different time domain resource assignment manners. For example, when the time domain resource assignment manner is the transport block processing over multi-slots (TBoMS) manner, the time domain resource assignment manner corresponds to a first TDRA table. When the time domain resource assignment manner is the TBoMS with repetition manner, the time domain resource assignment manner corresponds to a second TDRA table, and the second TDRA table includes the repetition number.

In some embodiments, for different time domain resource assignment manners, meanings of the second field are different.

Specifically, in an embodiment of the present disclosure, when the time domain resource assignment manner is the transport block processing over multi-slots (TBoMS) manner, the second field is interpreted as a slot number for TBoMS. When the time domain resource assignment manner is the repetition manner, the second field is interpreted as a repetition number for the repetition.

In some embodiments, the first field includes at least one of: a symbol length occupied by each transport block (TB) segment; a symbol length occupied by a transmission opportunity; a frequency hopping time domain granularity; a symbol length occupied by a coding block (CB)/coding block group (CBG); or a length of a joint channel estimation window.

In an embodiment of the present disclosure, the first field can be redefined as at least one of: a symbol length occupied by each transport block (TB) segment; a symbol length occupied by a transmission opportunity; a frequency hopping time domain granularity; a symbol length occupied by a coding block (CB)/coding block group (CBG); or a length of a joint channel estimation window. In different embodiments of the present disclosure, the first field can be defined as at least one of the aforementioned manners.

In some embodiments, the second field includes one or more of: a number of TB segments; a total number of transmission opportunities; a number of hops; a number of CBs/CBGs; a number of joint channel estimations.

In an embodiment of the present disclosure, the second field can be redefined as at least one of: a symbol length occupied by each transport block (TB) segment; a symbol length occupied by a transmission opportunity; a frequency hopping time domain granularity; a symbol length occupied by a coding block (CB)/coding block group (CBG); or a length of a joint channel estimation window. In different embodiments of the present disclosure, the second field can be defined as at least one of the aforementioned manners. After the first field is redefined, the second field can be adjusted accordingly based on the definition of the first field.

Figure 9:
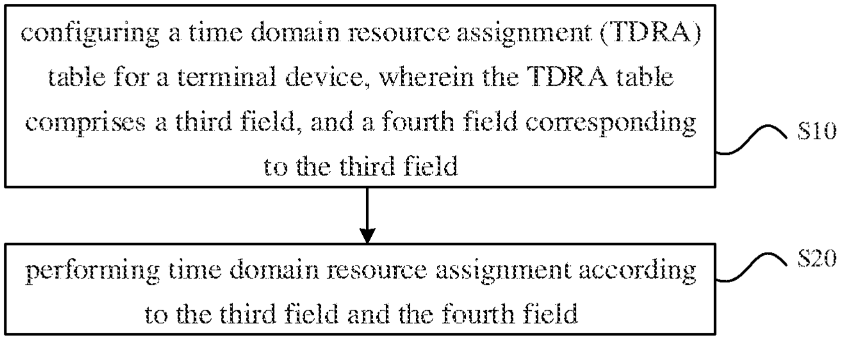
FIG. 9 is a flowchart illustrating a method for time domain resource assignment according to another embodiment of the present disclosure.

Please referring to FIG. 9, FIG. 9 is a flowchart illustrating a method for time domain resource assignment according to another embodiment of the present disclosure. The method may be performed by a base station. As illustrated in FIG. 9, the method may include, but is not limited to, the following blocks.

At block S10, a time domain resource assignment (TDRA) table is configured for a terminal device. The TDRA table includes a first field, and a second field corresponding to the first field.

At block S20, time domain resource assignment is performed according to the first field and the second field.

In some embodiments, performing the time domain resource assignment according to the first field and the second field includes: configuring a time domain resource assignment manner for the terminal device; and performing the time domain resource assignment according to the first field, the second field, and the time domain resource assignment manner.

In some embodiments, the method further includes: determining a number of effective rows in the TDRA table based on the time domain resource assignment manner; and performing the time domain resource assignment according to the first field, the second field, and the number of effective rows in the TDRA table.

In some embodiments, the time domain resource assignment manner includes at least one of the following transmission manners: a transport block processing over multi-slots (TBoMS) manner; a repetition manner; or a TBoMS with repetition manner.

In some embodiments, acquiring the time domain resource assignment manner includes: receiving a first symbol length of the first field and a second symbol length of the second field; and determining the time domain resource assignment manner based on the first symbol length and the second symbol length.

In some embodiments, acquiring the time domain resource assignment manner includes: receiving a first symbol length of the first field; and determining the time domain resource assignment manner based on the first symbol length.

In some embodiments, acquiring the time domain resource assignment manner includes: receiving a first configuration signaling, and determining the time domain resource assignment manner based on the first configuration signaling.

In some embodiments, first configuration signaling is a remaining minimum system information (RMSI) signaling, a radio resource control (RRC) signaling, a downlink control information (DCI) signaling, or a media access control control element (MAC CE) signaling.

In some embodiments, acquiring the time domain resource assignment manner includes: receiving configuration information of the terminal device; and determining the time domain resource assignment manner based on the configuration information of the terminal device.

In some embodiments, determining the corresponding time domain resource assignment manner based on the configuration information of the terminal device includes: acquiring a repetition number; and determining the corresponding time domain resource assignment manner based on the configuration information of the terminal device and the repetition number.

In some embodiments, acquiring the repetition number includes: configuring a repetition number set carried by an RMSI signaling or an RRC signaling for the terminal device; and configuring a DCI signaling or an MAC CE signaling for the terminal device, and selecting the repetition number from the repetition number set based on the DCI signaling or the MAC CE signaling.

In some embodiments, acquiring the repetition number includes: acquiring a repetition number setting identifier; and determining the repetition number based on the repetition number setting identifier.

In some embodiments, acquiring the repetition number includes: acquiring whether the TDRA table comprises state information of a repetition number field; and determining the repetition number based on the state information.

In some embodiments, a plurality of TDRA tables are provided, and each TDRA table corresponds to one time domain resource assignment manner.

In some embodiments, the plurality of TDRA tables includes a first TDRA table and a second TDRA table, and the second TDRA table further includes a repetition number relative to the first TDRA table.

In some embodiments, the first field includes one or more of: a symbol length occupied by each transport block (TB) segment; a symbol length occupied by a transmission opportunity; a frequency hopping time domain granularity; a symbol length occupied by a coding block (CB)/coding block group (CBG); or a length of a joint channel estimation window.

In some embodiments, the second field includes one or more of: a number of TB segments; a total number of transmission opportunities; a number of hops; a number of CBs/CBGs; or a number of joint channel estimations.

In some embodiments, the first field is carried by an L field in the TDRA table.

In some embodiments, the second field is carried by a repetition number field in the TDRA table.

The specific process of corresponding steps of the method for time domain resource assignment provided in the above embodiments of the present disclosure is similar to the method for time domain resource assignment provided in some of the above embodiments, and has achieved the same beneficial effect, which will not be repeated herein.

In embodiments provided in the present disclosure, the method proposed in the present disclosure is introduced from perspectives of the network device and the first terminal device. In order to achieve functions of the method proposed in embodiments of the present disclosure, the network device and the first terminal device may include hardware structures and software modules, to achieve the above functions in form of hardware structures, software modules, or a combination of hardware structures and software modules. One of the above functions can be executed in the form of hardware structures, software modules, or the combination of hardware structures and software modules.

Figure 10:
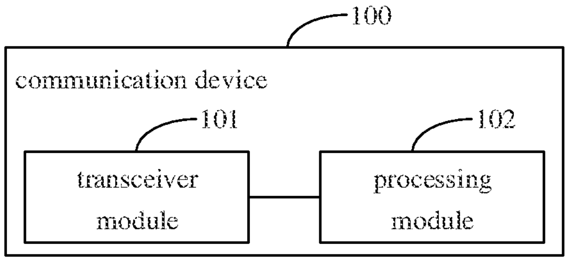
FIG. 10 is a block diagram illustrating a communication device according to an embodiment of the present disclosure.

FIG. 10 is a block diagram illustrating a communication device 100 according to an embodiment of the present disclosure. As illustrated in FIG. 10, the communication device 100 may include a transceiver module 101 and a processing module 102. The transceiver module 101 may include a sending module and/or a receiving module. The sending module is configured to achieve a sending function, and the receiving module is configured to achieve a receiving function. The transceiver module 101 may achieve the sending function and/or the receiving function.

The communication device 100 may be a terminal device (such as a first terminal device in the aforementioned method embodiment), an apparatus in the terminal device, or an apparatus that can be matched and used with the terminal device. Alternatively, the communication device 100 may be a network device, an apparatus within the network device, or an apparatus that can be matched and used with the network device.

When the communication device 100 is the terminal device, the transceiver module 101 is configured to acquire a time domain resource assignment (TDRA) table, in which the TDRA table includes a first field, and a second field corresponding to the first field. The processing module 102 is configured to performing time domain resource assignment according to the first field and the second field.

When the communication device 100 is the network device, the transceiver module 101 is configured to configure a time domain resource assignment (TDRA) table for a terminal device, in which the TDRA table includes a first field, and a second field corresponding to the first field. The processing module 102 is configured to perform time domain resource assignment according to the first field and the second field.

Figure 11:
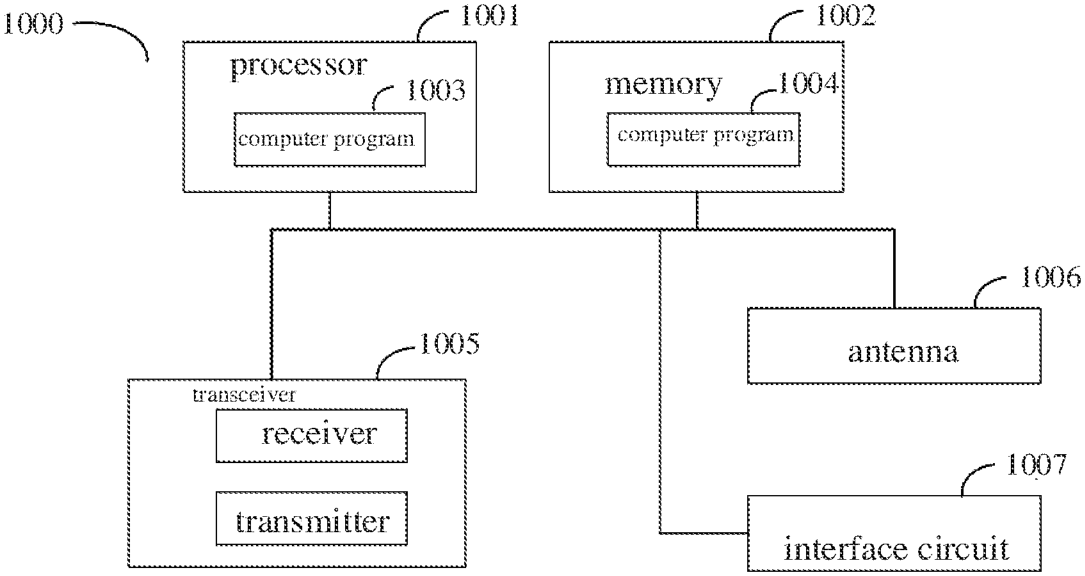
FIG. 11 is a block diagram illustrating a communication device according to another embodiment of the present disclosure.

FIG. 11 is a block diagram illustrating a communication device 1000 provided in another embodiment of the present disclosure. The communication device 1000 may be a terminal device, or a chip, a chip system, or a processor that supports a network device to implement the above method, or a chip, a chip system, or a processor that supports the terminal device to implement the above method. This device may be configured to implement the method as described in the above method embodiments, the details of which may refer to illustration of the above method embodiments.

The communication device 1000 may include one or more processors 1001. The processor 1001 may be a general-purpose processor, a dedicated processor, or the like. For example, the processor 1001 may be a baseband processor or a central processing unit. The baseband processor may be configured to process a communication protocol and communication data, while the central processor may be configured to control the communication devices (such as a base station, a baseband chip, a terminal device, a terminal chip, a DU or a CU, etc.), execute a computer program, and process data from computer program.

Optionally, the communication device 1000 may further include one or more memories 1002, each with a computer program 1004 stored thereon. The processor 1001 may execute the computer program 1004 to enable the communication device 1000 to execute the method as described in the above method embodiments. Optionally, the memory 1102 may further store data. The communication device 1000 and the memory 1002 may be set separately or integrated together.

Optionally, the communication device 1000 may further include a transceiver 1005 and an antenna 1006. The transceiver 1005 may be referred to as a transceiver unit, transceiver, or transceiver circuit, etc., configured to achieve a transceiver function. The transceiver 1005 may include a receiver and a transmitter, and the receiver may be referred to as a receiver or a reception circuit, etc., configured to achieve a reception function; the transmitters may be referred to as a transmitter or a transmission circuit, etc., configured to achieve a transmission function.

Optionally, the communication device 1000 may also include one or more interface circuits 1007. The interface circuit 1007 is configured to receive code instructions and transmit the code instructions to the processor 1001. The processor 1001 runs the code instructions causing the communication device 1000 to execute the method as described in the above method embodiment.

The communication device 1000 is a terminal device. The transceiver 1005 is configured to perform the block S1 in FIG. 2. The processor 1001 is configured to execute the block S2 in FIG. 2.

The communication device 1100 is a network device. The transceiver 1005 is configured to execute the block S10 in FIG. 9. The processor 1001 is configured to execute the block S20 in FIG. 9.

In an implementation, processor 1001 may include a transceiver for implementing reception and transmission functions. For example, the transceiver may be a transceiver circuit, an interface, or an interface circuit. The transceiver circuit, the interface, or the interface circuit for achieving the reception and transmission functions may be separate or integrated together. The above-mentioned transceiver circuit, interface or interface circuit may be configured for reading and writing codes/data, or the aforementioned transceiver circuit, interface or interface circuit may be configured for transmitting or transferring of signals.

In an implementation, the processor 1001 may store a computer program 1003. The computer program 1003 may cause communication device 1000 to execute the method described in the above method embodiment when running on the processor 1001. The computer program 1003 may be embedded in the processor 1001, in which case the processor 1001 may be implemented by hardware.

In an implementation, the communication device 1000 may include a circuit that may achieve functions of sending, receiving, or communicating in the aforementioned method embodiments. The processor and the transceiver described in the present disclosure may be implemented on an integrated circuit (IC), an analog IC, a radio frequency integrated circuit (RFIC), a mixed signal IC, an application specific integrated circuits (ASIC), a printed circuit boards (PCB), an electronic device, and the like. The processor and the transceiver may also be manufactured using various IC process technologies, such as complementary metal oxide semiconductor (CMOS), N-type metal oxide semiconductor (NMOS), P-type metal oxide semiconductor (PMOS), bipolar junction transistor (BJT), bipolar CMOS (BiCMOS), silicon germanium (SiGe), gallium arsenide (GaAs), etc.

The communication device described in the above embodiments may be a network device or a terminal device (such as the first terminal device in the aforementioned method embodiment), but the scope of the communication device described in the present disclosure is not limited to this, and the structure of the communication device may not be limited by FIG. 11. The communication device can be an independent device or can be part of a larger device. For example, the communication device may be:

(1) an independent integrated circuit IC, or a chip, or a chip system or subsystem;

(2) a set of one or more ICs, optionally including a storage element for storing data and the computer program;

(3) an ASIC, such as a modem;

(4) modules that can be embedded in other devices;

(5) a receiver, a terminal, a smart terminal, a cellular phone, a wireless device, a handheld device, a mobile unit, an on-board device, a network device, a cloud device, an artificial intelligence device, etc.;

(6) others and the like.

Figure 12:
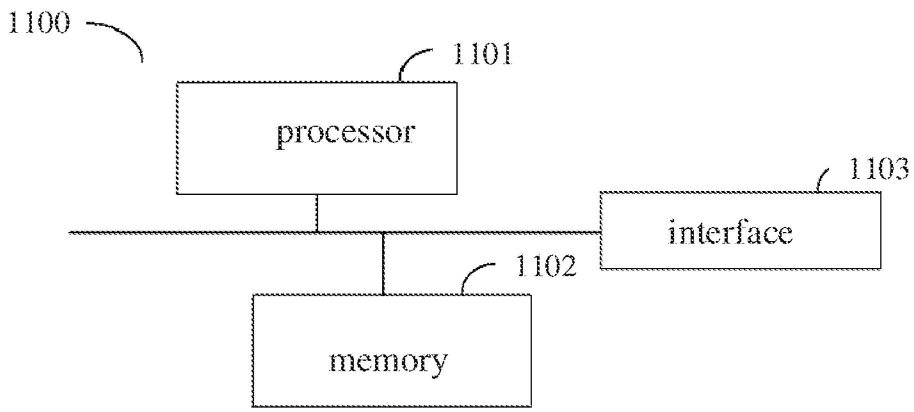
FIG. 12 is a block diagram illustrating a chip according to an embodiment of the present disclosure.

For a case that the communication device is the chip or the chip system, please refer to a schematic diagram of a structure of the chip shown in FIG. 12. The chip shown in FIG. 12 includes a processor 1101 and an interface 1102. A number of processors 1101 may be one or more, and a number of interfaces 1102 may be multiple.

For a case where the chip is configured to implement functions of the terminal device in embodiments of the present disclosure:

the interface 1102 is configured to execute the block S1 in FIG. 2; the processor 1101 is configured to execute the block S2 in FIG. 2.

For a case where the chip is configured to implement functions of the network device in embodiments of the present disclosure:

the interface 1102 is configured to execute the block S10 in FIG. 9; the processor 1101 is configured to execute the block S20 in FIG. 9.

Optionally, the chip may further include a memory 1103, configured to store a necessary computer program and data.

Those skilled in the art may also understand that various illustrative logical blocks and steps listed in embodiments of the present disclosure can be implemented through electronic hardware, computer software, or a combination thereof. Whether such functions are implemented through hardware or software depends on a specific application and design requirements of an overall system. Those skilled in the art may use various methods to implement functions for each specific application, but such implementation should not be understood as beyond the scope of protection of embodiments of the present disclosure.

The present disclosed embodiment also provides a communication system, which includes a communication device as a terminal device (such as the terminal device in the aforementioned method embodiment) and a communication device as a network device in the aforementioned embodiment as described in the aforementioned embodiment of FIG. 10, or a communication device as a terminal device (such as the terminal device in the aforementioned method embodiment) and a communication device as a network device in the aforementioned embodiment as described in the aforementioned embodiment of FIG. 11.

The present disclosure also provides a computer-readable storage medium with instructions stored thereon; the instructions is configured to implement functions of any of the above method embodiments when executed by a computer.

The present disclosure also provides a computer program product, configured to implement functions of any of the above method embodiments when executed by a computer.

The beneficial effects of the computer-readable storage medium, the computer program product, and the computer program mentioned above are the same as those of the method for time domain resource assignment in some aforementioned embodiments, which will not be repeated herein.

All or part of the above embodiments can be implemented through software, hardware, firmware, or any combination thereof. When implemented using the software, all or part of the above embodiments can be implemented in the form of computer program product. The computer program product includes one or more computer programs. When loading and executing the computer programs on a computer, the computer programs may be generated all or part of processes or functions according to embodiments of the present disclosure. The computer can be a general-purpose computer, a specialized computer, a computer network, or other programmable devices. The computer programs can be stored on a computer-readable storage media or transmitted from one computer readable storage medium to another, for example, the computer programs can be transmitted from a website site, a computer, a server or a data center to another website site, computer, server, or data center through wired (such as coaxial cable, fiber optic, digital subscriber line (DSL)) or wireless (such as infrared, wireless, microwave, etc.) methods. The computer-readable storage medium can be any available medium that a computer can access, or a data storage device such as a server including one or more available media integrations or a data center. The available media can be a magnetic media (such as a floppy disk, a hard drive, a magnetic tape), an optical media (such as a high-density digital video disc (DVD)), or a semiconductor media (such as a solid state disk (SSD)), etc.

Unless the context otherwise requires, in the entire specification and claims, the term "comprise" and other forms such as the third person singular form "comprises" and the present participle form "comprising" are interpreted as open and inclusive, meaning "including, but not limited to". In description of the specification, the terms "one embodiment", "some embodiments", "exemplary embodiments", "example", "specific example", or "some examples" are intended to indicate that specific features, structures, materials, or characteristics related to the embodiment or example are included in at least one embodiment or example of the present disclosure. The schematic representation of the above terms may not necessarily refer to the same embodiment or example. In addition, the specific features, structures, materials, or characteristics described may be included in any one or more embodiments or examples in any appropriate manner.

Those ordinary skilled in the art may understand that first, second, and other numerical numbers involved in the disclosure are distinguished only for convenience of description, and are not intended to limit the scope of embodiments of the present disclosure, nor indicate an order.

At least one in this disclosure can also be described as one or more, and a plurality can be two, three, four, or more, without limitation in this disclosure. In embodiments of the present disclosure, for one type of technical feature, technical features in the type of technical feature are distinguished by "first", "second", "third", "A", "B", "C", and "D". The technical features described by "first", "second", "third", "A", "B", "C", and "D" are without any order or sequence.

Correspondences shown in respective tables in the present disclosure can be configured or predefined. The values of information in each table are only examples and can be configured as other values, which will not limited in the present disclosure. When configuring the correspondence between information and various parameters, it is not necessary to configure all the correspondence shown in each table. For example, in the table in the present disclosure, the correspondences shown in certain rows may not be configured. For example, an appropriate deformation adjustment can be made based on the above table, such as splitting, merging, etc. Names of parameters shown in a title of the above table can also use other names that can be understood by the communication device, and the values or representations of the parameters can also use other values or representations that can be understood by the communication device. When implementing the above tables, other data structures can also be used, such as an array, a queue, a container, a stack, a linear table, a pointer, a linked list, a tree, a graph, a structure, a class, a heap, a hash table, or a hash table.

The term predetermined in this disclosure can be understood as defined, predefined, stored, prestored, prenegotiated, preconfigured, cured, or prefired.

Those ordinary skilled in the art can realize that a unit and an algorithm step of each example described in combination with embodiments in the present disclosure can be implemented in electronic hardware, or a combination of computer software and the electronic hardware. Whether such functions are executed in hardware or software depends on specific applications and design constraints of the technical solution. Those skilled may use different methods to implement the described functions for each specific application, but such implementation should not be considered beyond the scope of this disclosure.

Those skilled in the art can clearly understand that for convenience and conciseness of description, specific working processes of the system, device, and unit described above can refer to the corresponding processes in the aforementioned method embodiments, and will not be repeated here.

The above description is only a specific implementation of the disclosure, but the scope of protection of the disclosure is not limited to this. Any changes or replacements that can easily be imagined by any skilled person familiar with the technical field within the scope of the disclosure should be covered within the scope of protection of the disclosure. Therefore, the scope of protection of the disclosure should be based on the scope of protection of claims.

The invention claimed is:

1. A method for time domain resource assignment, performed by a terminal device, comprising:
- acquiring a time domain resource assignment (TDRA) table, wherein the TDRA table comprises a first field, and a second field corresponding to the first field; and
- performing time domain resource assignment according to the first field and the second field;
- wherein the first field comprises a symbol length occupied by a transmission opportunity, and the second field comprises a total number of transmission opportunities;
- wherein performing the time domain resource assignment according to the first field and the second field comprises:
  - acquiring a time domain resource assignment manner; and
  - performing the time domain resource assignment according to the first field, the second field, and the time domain resource assignment manner;
- wherein the time domain resource assignment manner comprises at least one of:
  - a transport block processing over multi-slots (TBoMS) manner; or
  - a TBoMS with repetition manner.

2. The method according to claim 1, further comprising:
- determining a number of effective rows in the TDRA table based on the time domain resource assignment manner; and
- performing the time domain resource assignment according to the first field, the second field, and the number of effective rows in the TDRA table.

3. The method according to claim 1, wherein acquiring the time domain resource assignment manner comprises:
- receiving a first configuration signaling; and
- determining the time domain resource assignment manner based on the first configuration signaling.

4. The method according to claim 3, wherein the first configuration signaling is a radio resource control (RRC) signaling or a downlink control information (DCI) signaling.

5. The method according to claim 1, wherein acquiring the time domain resource assignment manner comprises:
acquiring configuration information of the terminal device; and
determining the time domain resource assignment manner based on the configuration information of the terminal device.

6. The method according to claim 5, wherein determining the corresponding time domain resource assignment manner based on the configuration information of the terminal device comprises:
acquiring a repetition number; and
determining the corresponding time domain resource assignment manner based on the configuration information of the terminal device and the repetition number.

7. The method according to claim 6, wherein acquiring the repetition number comprises:
acquiring whether the TDRA table comprises state information of a repetition number field; and
determining the repetition number based on the state information.

8. A non-transitory computer-readable storage medium having stored thereon instructions that, when executed by a processor of a terminal device, cause the terminal device to perform the method according to claim 1.

9. A method for time domain resource assignment, performed by a base station, comprising:
configuring a time domain resource assignment (TDRA) table for a terminal device, wherein the TDRA table comprises a first field, and a second field corresponding to the first field; and
performing time domain resource assignment according to the first field and the second field;
wherein the first field comprises: a symbol length occupied by a transmission opportunity, and the second field comprises: a total number of transmission opportunities;
wherein performing the time domain resource assignment according to the first field and the second field comprises:
configuring a time domain resource assignment manner for the terminal device; and
performing the time domain resource assignment according to the first field, the second field, and the time domain resource assignment manner;
wherein the time domain resource assignment manner comprises at least one of:
a transport block processing over multi-slots (TBoMS) manner; or
a TBoMS with repetition manner.

10. The method according to claim 9, further comprising:
determining a number of effective rows in the TDRA table based on the time domain resource assignment manner; and
performing the time domain resource assignment according to the first field, the second field, and the number of effective rows in the TDRA table.

11. The method according to claim 9, wherein acquiring the time domain resource assignment manner comprises:
receiving a first configuration signaling; and
determining the time domain resource assignment manner based on the first configuration signaling.

12. The method according to claim 11, wherein the first configuration signaling is a radio resource control (RRC) signaling or a downlink control information (DCI) signaling.

13. The method according to claim 9, wherein acquiring the time domain resource assignment manner comprises:
receiving configuration information of the terminal device; and
determining the time domain resource assignment manner based on the configuration information of the terminal device.

14. The method according to claim 13, wherein determining the corresponding time domain resource assignment manner based on the configuration information of the terminal device comprises:
acquiring a repetition number; and
determining the corresponding time domain resource assignment manner based on the configuration information of the terminal device and the repetition number.

15. The method according to claim 14, wherein acquiring the repetition number comprises:
acquiring whether the TDRA table comprises state information of a repetition number field; and
determining the repetition number based on the state information.

16. A communication device, comprising:
a processor; and
a memory having a computer program stored thereon, wherein the processor is configured to:
acquire a time domain resource assignment (TDRA) table, wherein the TDRA table comprises a first field, and a second field corresponding to the first field; and
perform time domain resource assignment according to the first field and the second field;
wherein the first field comprises: a symbol length occupied by a transmission opportunity, and the second field comprises: a total number of transmission opportunities;
wherein the processor is further configured to:
acquire a time domain resource assignment manner; and
perform the time domain resource assignment according to the first field, the second field, and the time domain resource assignment manner;
wherein the time domain resource assignment manner comprises at least one of:
a transport block processing over multi-slots (TBoMS) manner; or
a TBoMS with repetition manner.

* * * * *